United States Patent
Suzuki et al.

(10) Patent No.: US 11,420,877 B2
(45) Date of Patent: Aug. 23, 2022

(54) LITHIUM FLUOROSULFONATE PRODUCTION METHOD

(71) Applicant: DAIKIN INDUSTRIES, LTD., Osaka (JP)

(72) Inventors: Yuuki Suzuki, Osaka (JP); Akiyoshi Yamauchi, Osaka (JP); Kotaro Hayashi, Osaka (JP); Yoshihiro Yamamoto, Osaka (JP); Yosuke Kishikawa, Osaka (JP); Tatsuya Ohtsuka, Osaka (JP); Atsushi Maruo, Osaka (JP); Hiroyuki Arima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 116 days.

(21) Appl. No.: 16/645,632

(22) PCT Filed: Sep. 18, 2018

(86) PCT No.: PCT/JP2018/034399
§ 371 (c)(1),
(2) Date: Mar. 9, 2020

(87) PCT Pub. No.: WO2019/073755
PCT Pub. Date: Apr. 18, 2019

(65) Prior Publication Data
US 2020/0262709 A1    Aug. 20, 2020

(30) Foreign Application Priority Data
Oct. 11, 2017    (JP) .............................. JP2017-197972

(51) Int. Cl.
*C01D 15/06*    (2006.01)

(52) U.S. Cl.
CPC ................................... *C01D 15/06* (2013.01)

(58) Field of Classification Search
CPC ................................ C01D 15/00; C01D 15/06
See application file for complete search history.

(56) References Cited

U.S. PATENT DOCUMENTS

| 2010/0121025 | A1* | 5/2010 | Peng | ........................ | C08F 14/18 |
| | | | | | 528/391 |
| 2014/0038062 | A1 | 2/2014 | Kawakami et al. | | |

FOREIGN PATENT DOCUMENTS

| JP | 2012-218985 A | 11/2012 |
| JP | 2012-232888 A | 11/2012 |
| JP | 2016-8145 A | 1/2016 |
| WO | 2012/141180 A1 | 10/2012 |

OTHER PUBLICATIONS

International Preliminary Report on Patentability with a Translation of Written Opinion in International Application No. PCT/JP2018/034399, dated Apr. 14, 2020.
International Search Report dated Dec. 4, 2018, issued by the International searching Authority in counterpart International Patent Application No. PCT/JP2018/034399 (PCT/ISA/210).
Communication dated Apr. 12, 2021, from the European Patent Office in application No. 18866790.1.

* cited by examiner

*Primary Examiner* — Ngoc-Yen Nguyen
(74) *Attorney, Agent, or Firm* — Sughrue Mion, PLLC

(57) ABSTRACT

A method for producing lithium fluorosulfonate which includes reacting $XSO_3H$, wherein X is a leaving group other than fluorine, with a lithium source and a fluorine source. Also disclosed is a composition containing $XSO_3H$.

1 Claim, No Drawings

LITHIUM FLUOROSULFONATE PRODUCTION METHOD

CROSS REFERENCE TO RELATED APPLICATIONS

This application is a National Stage of International Application No. PCT/JP2018/034399 filed Sep. 18, 2018 claiming priority from Japanese Patent Application No. 2017-197972 filed on Oct. 11, 2017.

TECHNICAL FIELD

The invention relates to methods for producing lithium fluorosulfonate.

BACKGROUND ART

Known methods for synthesizing lithium fluorosulfonate are synthesis methods utilizing a reaction of fluorosulfonic acid with a variety of lithium salts such as lithium carboxylate and lithium chloride. For example, Patent Literature 1 discloses a method of reacting fluorosulfonic acid or sulfur trioxide with a lithium halide in hydrofluoric anhydride. Patent Literature documents 2 to 4 disclose methods of reacting fluorosulfonic acid with lithium carboxylate. Patent Literature documents 3 to 5 disclose methods of reacting fluorosulfonic acid with a lithium halide.

CITATION LIST

Patent Literature

Patent Literature 1: JP 2016-8145 A
Patent Literature 2: JP 2012-232888 A
Patent Literature 3: WO 2012/141180
Patent Literature 4: US 2014/38062
Patent Literature 5: JP 2012-218985 A

SUMMARY OF INVENTION

Technical Problem

Unfortunately, fluorosulfonic acid used as a starting material is difficult to obtain and is very difficult to handle because it easily reacts with moisture in the air to generate hydrogen fluoride. The resulting hydrogen fluoride may corrode a reaction container, which creates a need for a special reaction container made of, for example, HASTELLOY. The invention aims to provide a method for producing lithium fluorosulfonate using materials which are easy to obtain and handle.

Solution to Problem

The inventors examined a method for producing lithium fluorosulfonate without fluorosulfonic acid and found that, unlike conventional cases where fluorosulfonic acid or sulfur trioxide is reacted with a lithium source alone, reacting $XSO_3H$, wherein X is a leaving group other than fluorine, which serves as a sulfonic acid source with both a lithium source and a fluorine source enables simple and easy introduction of lithium and fluorine into the sulfonic acid source. Thereby, the inventors completed the invention.

In other words, the invention relates to a method for producing lithium fluorosulfonate including reacting $XSO_3H$, wherein X is a leaving group other than fluorine, with a lithium source and a fluorine source.

The leaving group X is preferably chlorine, bromine, or iodine. In order to obtain the material easily, chlorine is more preferred.

$XSO_3H$, wherein X is a leaving group other than fluorine, is preferably chlorosulfonic acid.

More preferred is to use lithium fluoride as the lithium source and as the fluorine source because it can serve as both the lithium source and the fluorine source and thus can eliminate the need for the use of two materials.

Preferably, $XSO_3H$, wherein X is a leaving group other than fluorine, is chlorosulfonic acid and the lithium source and the fluorine source are lithium fluoride.

The invention also relates to a composition containing $XSO_3H$, wherein X is a leaving group other than fluorine, and lithium fluorosulfonate.

$XSO_3H$, wherein X is a leaving group other than fluorine, is preferably chlorosulfonic acid.

Advantageous Effects of Invention

The method for producing lithium fluorosulfonate of the invention can eliminate the use of fluorosulfonic acid which is difficult to handle, and thus can relatively easily produce lithium fluorosulfonate. The production method can exhibit effects of allowing the reaction to progress even in the absence of a solvent and of providing a high yield.

DESCRIPTION OF EMBODIMENTS

The method for producing lithium fluorosulfonate of the invention includes reacting $XSO_3H$, wherein X is a leaving group other than fluorine, with a lithium source and a fluorine source. H of $XSO_3H$, which is a strong acid, is replaced by lithium so that a salt is formed, and X is replaced by fluorine.

X in $XSO_3H$ that serves as the sulfonic acid source may be any leaving group other than fluorine. Examples thereof include a halogen group other than fluorine, an organic acid ester group, an inorganic acid ester group, an onium group such as ammonium, a hydroxy group, and an ether group. Examples of the halogen group include chlorine, bromine, and iodine. Examples of the organic acid ester group include a carboxylate and a sulfonate. Examples of the inorganic acid ester group include a sulfate, a nitrate, a phosphate, and a borate.

$XSO_3H$ that serves as the sulfonic acid source containing the leaving group can be more easily obtained or synthesized than fluorosulfonic acid. In order to obtain the material easily, more preferred among these is a halogen group. In order to obtain the material inexpensively, still more preferred among these is chlorine. In other words, $XSO_3H$, wherein X is a leaving group other than fluorine, is preferably chlorosulfonic acid.

Examples of the lithium source include, but are not limited to, a lithium halide, an organic acid lithium, an inorganic acid lithium, lithium metal, and lithium hydride. In order to obtain or handle the material easily, preferred among these is a lithium halide. Examples of the lithium halide include lithium fluoride, lithium chloride, lithium bromide, and lithium iodide. In order to use the material also as the fluorine source, most preferred is lithium fluoride. These lithium sources may be used alone, or may be used in combination of two or more thereof.

The lithium source may be used in any amount relative to $XSO_3H$. When the amount of substance of lithium atoms contained in 1 mol of the lithium source is defined as n mol, the mole ratio of the lithium source to 1 mol of $XSO_3H$ is preferably $0.75 \times 1/n$ to $1.5 \times 1/n$ mol, more preferably $0.9 \times 1/n$ to $1.1 \times 1/n$ mol. The lithium source at a mole ratio of higher than $1.1 \times 1/n$ mol tends to cause part of the lithium source to remain unreacted, resulting in a low purity of lithium fluorosulfonate. The lithium source at a mole ratio of lower than $0.9 \times 1/n$ mol tends to cause part of $XSO_3H$ to remain unreacted, causing an increased amount of an organic solvent for washing and resultantly a cost increase.

The fluorine source is preferably, but not limited to, a nucleophilic fluorinating agent. Examples of the nucleophilic fluorinating agent include a fluorine atom, hydrogen fluoride, a metal fluoride, and an organofluorinated chemical.

Examples of the metal fluoride include alkali metal fluoride salts such as lithium fluoride, sodium fluoride, potassium fluoride, rubidium fluoride, and caesium fluoride, and hydrogen fluoride salts thereof such as $LiF(HF)_{n'}$, $NaF(HF)_{n'}$, $KF(HF)_{n'}$, $RbF(HF)_{n'}$, and $CsF(HF)_{n'}$ (wherein n' is a number selected from the group of numbers greater than 0); and alkaline earth metal fluoride salts such as $BeF_2$, $BeFCl$, $MgF_2$, $MgFCl$, $CaF_2$, $SrF_2$, and $BaF_2$.

Examples of the organofluorinated chemical include commercially available nucleophilic fluorinating agents, including ammonium fluoride salts such as ammonium fluoride, methylammonium fluoride, dimethylammonium fluoride, trimethylammonium fluoride, tetramethylammonium fluoride, ethylammonium fluoride, diethylammonium fluoride, triethylammonium fluoride, tetraethylammonium fluoride, tripropylammonium fluoride, tributylammonium fluoride, tetrabutylammonium fluoride, benzyldimethylammonium fluoride, pyridinium fluoride, methylpyridinium fluoride, dimethylpyridinium fluoride, and trimethylpyridinium fluoride, and hydrogen fluoride salts thereof such as $NH_4F(HF)_{n'}$, $CH_3NH_3F(HF)_{n'}$, $(CH_3)_2NH_2F(HF)_{n'}$, $(CH_3)_3NHF(HF)_{n'}$, $(CH_3)_4NF(HF)_{n'}$, $(C_2H_5)_3NHF(HF)_{n'}$, $(C_2H_5)_4NF(HF)_{n'}$, $(C_3H_7)_4NF(HF)_{n'}$, $(C_4H_9)_4NF(HF)_{n'}$, and pyridine. $HF(HF)_{n'}$ (wherein n' is a number selected from the group of numbers greater than 0); phosphonium fluoride salts such as tetramethylphosphonium fluoride, tetraethylphosphonium fluoride, tetrapropylphosphonium fluoride, tetrabutylphosphonium fluoride, and tetraphenylphosphonium fluoride, and $(HF)_{n'}$ salts thereof (wherein n' is a number selected from the group of numbers greater than 0); and N,N-diethylaminosulfur trifluoride and $IF_5$-pyridine-HF. The number selected from the group of numbers means any number selected from all numbers and fractions, such as 0.1, 0.2, 0.25, 0.3, 0.4, 0.5, 0.75, 0.8, 0.9, 1, 1.1, 1.2, 1.25, 1.3, 1.5, 1.75, 2, 2.5, 3, 3.5, 4, 4.5, and 5. In order to obtain and handle the material easily, a metal fluoride is preferred. In order to use the material as both the lithium source and the fluorine source, lithium fluoride is more preferred. These fluorine sources may be used alone, or may be used in combination of two or more thereof.

In a preferred embodiment of the method for producing lithium fluorosulfonate of the invention, the lithium source and the fluorine source are lithium fluoride. In a preferred embodiment of the method for producing lithium fluorosulfonate of the invention, $XSO_3H$, wherein X is a leaving group other than fluorine, is chlorosulfonic acid and the lithium source and the fluorine source are lithium fluoride.

The fluorine source may be used in any amount relative to $XSO_3H$. When the amount of substance of fluorine atoms contained in 1 mol of the fluorine source is defined as m mol, the mole ratio of the fluorine source to 1 mol of $XSO_3H$ is preferably $0.75 \times 1/m$ to $1.5 \times 1/m$ mol, more preferably $0.9 \times 1/m$ to $1.1 \times 1/m$ mol. The fluorine source at a mole ratio of higher than $1.1 \times 1/m$ mol tends to cause part of the fluorine source to remain unreacted, resulting in a low purity of lithium fluorosulfonate. The fluorine source at a mole ratio of lower than $0.9 \times 1/m$ mol tends to cause part of $XSO_3H$ to remain unreacted, causing an increased amount of an organic solvent for washing and resultantly a cost increase.

The fluorine source may be used in any amount relative to the lithium source. When the amount of substance of lithium atoms contained in 1 mol of the lithium source is defined as n mol and the amount of substance of fluorine atoms contained in 1 mol of the fluorine source is defined as m mol, the mole ratio of the fluorine source to $1/n$ mol of the lithium source is preferably $0.75 \times 1/m$ to $1.5 \times 1/m$ mol, more preferably $1.0 \times 1/m$ to $1.2 \times 1/m$ mol. The fluorine source at a mole ratio of lower than $1.0 \times 1/m$ mol tends to cause generation of $XSO_3Li$, resulting in a low purity.

The reaction of $XSO_3H$ with the lithium source and the fluorine source is performed in a reaction container. With regard to a way of adding the materials to the reaction system, each of the materials may be added at once or may be added dropwise. The materials may be added in any order. For example, $XSO_3H$ that serves as the sulfonic acid source may be first added prior to simultaneous dropwise addition of the lithium source and the fluorine source, or dropwise addition of the lithium source and then dropwise addition of the fluorine source, or dropwise addition of the fluorine source and then dropwise addition of the lithium source. In order to easily control the amount of the materials to be added dropwise and to easily control the reaction temperature, preferred is to add dropwise $XSO_3H$ to a reaction container that contains the lithium source and the fluorine source.

When chlorosulfonic acid and lithium fluoride are used, for example, hydrogen chloride is generated as a by-product. In order to remove this hydrogen chloride and allow the reaction to progress more rapidly, the reaction system is preferably under reduced pressure.

The reaction of $XSO_3H$ with the lithium source and the fluorine source may be performed in the absence of a solvent, and may be performed in the presence of a solvent. The solvent to be used may be any nonaqueous solvent, and is more preferably an aprotic solvent.

Examples of the aprotic solvent include, but are not limited to, carbonates such as dimethyl carbonate, ethyl methyl carbonate, and diethyl carbonate, acyclic esters such as methyl acetate, ethyl acetate, ethyl methanesulfonate, and methyl ethanesulfonate, acyclic ethers such as diethyl ether, ethyl propyl ether, and dimethoxyethane, cyclic ethers such as tetrahydrofuran, 1,3-dioxane, and 1,4-dioxane, lactones, ketones, aldehydes, amides, hydrocarbon solvents, and halogen-containing solvents such as dichloromethane and chloroform. In order to dissolve lithium fluorosulfonate, preferred among these are polar solvents. In order to easily obtain and handle the solvent and to easily evaporate the solvent when it remains, more preferred are carbonates such as dimethyl carbonate, ethyl methyl carbonate, and diethyl carbonate. Even a protonic solvent may also be used as long as it is a higher alcohol that does not react with lithium fluorosulfonate.

The reaction may be performed in any atmosphere. In order to prevent decomposition of the materials by water, mixing is preferably performed in an atmosphere shielded from the outside air. For example, the reaction is more preferably performed in an inert gas atmosphere such as dry air, nitrogen atmosphere, or argon atmosphere. Such a gas may be introduced before initiation of the reaction or may be fed continually.

The reaction temperature is preferably, but not limited to, 0° C. to 150° C., more preferably 30° C. to 120° C., still more preferably 50° C. to 100° C. The reaction at a temperature of higher than 100° C. tends to cause easy evaporation of the material $XSO_3H$, resulting in a low yield. The reaction at a temperature of lower than 50° C. tends to cause a low reaction rate, resulting in a low yield.

The reaction is followed by a post-treatment for evaporation of by-products and solvents by a common technique. For example, when chlorosulfonic acid is used as the sulfonic acid source, lithium fluoride is used as the fluorine source and the lithium source, and no solvent is used, a recrystallization operation is performed to remove unreacted lithium fluoride. Any recrystallization solvent may be used in this operation. Preferred is a solvent that does not dissolve lithium fluoride but dissolves lithium fluorosulfonate. The recrystallization solvent used may be a carbonate such as dimethyl carbonate. The recrystallization solvent may be used in any amount that can dissolve at least once the crude lithium fluorosulfonate after the reaction. The recrystallization temperature may be any temperature that is not higher than the boiling point of the recrystallization solvent. Too high a recrystallization temperature may unfortunately cause decomposition of lithium fluorosulfonate. Thus, the recrystallization temperature is preferably 100° C. or lower, more preferably 80° C. or lower. After the crude lithium fluorosulfonate is dissolved, an operation such as filtration is preferably performed as appropriate to remove undissolved matter such as unreacted lithium fluoride. The recrystallization temperature may be any temperature that is lower than the dissolution temperature, and is preferably not lower than the melting point of the solvent used. For example, in the case of dimethyl carbonate, the recrystallization temperature is preferably 4° C. to 10° C.

When the reaction is performed in the presence of a solvent, for example when dimethyl carbonate is used as a solvent, lithium fluorosulfonate that is a reaction product is dissolved in the solvent. Thus, lithium fluorosulfonate can be obtained in the form of crystals after unreacted lithium fluoride is removed by an operation such as filtration and the reaction solution is cooled down. The amount of the solvent used and the cooling temperature in this procedure are preferably the same as those in the above recrystallization operation.

The composition of the invention contains $XSO_3H$, wherein X is a leaving group other than fluorine, and lithium fluorosulfonate. $XSO_3H$, wherein X is a leaving group other than fluorine, in the composition is preferably present in an amount of 1000 ppm or less, more preferably 500 ppm or less, still more preferably 100 ppm or less. The lower limit may be 0.1 ppm. $XSO_3H$, wherein X is a leaving group other than fluorine, is preferably chlorosulfonic acid.

The remaining $XSO_3H$ can be determined by liquid chromatography, for example.

EXAMPLES

The invention is described hereinbelow with reference to examples, but the invention is not intended to be limited by these examples.

Example 1

A reaction container was charged with 13.4 g (115.0 mmol) of chlorosulfonic acid serving as a sulfonic acid source and 3.0 g (115.7 mmol) of lithium fluoride serving as a lithium source and a fluorine source, and the contents were reacted at 100° C. in the absence of a solvent. The reaction was followed by cooling down to room temperature and addition of 50 mL of dimethyl carbonate (DMC). The mixture was heated up to 60° C., so that crude lithium fluorosulfonate was completely dissolved. This solution was filtered so that the residue was removed, and the solution was then cooled down to 5° C. Thereby, 12.4 g of lithium fluorosulfonate containing dimethyl carbonate was obtained. The dimethyl carbonate was then evaporated therefrom, whereby 6.7 g (63.2 mmol, yield 54%, chlorosulfonic acid residue 79 ppm) of lithium fluorosulfonate was obtained.

Example 2

A reaction container was charged with 3.0 g (115.7 mmol) of lithium fluoride serving as a lithium source and a fluorine source and 60 mL of dimethyl carbonate serving as a solvent. Thereto was added dropwise 13.4 g (115.0 mmol) of chlorosulfonic acid serving as a sulfonic acid source, and the contents were reacted at 70° C. The reaction was followed by filtration of the reaction solution to remove the residue, and the solution was then cooled down to 5° C. Thereby, 15.5 g of lithium fluorosulfonate containing dimethyl carbonate was obtained. The dimethyl carbonate was then evaporated therefrom, whereby 10.6 g (99.7 mmol, yield 86%, chlorosulfonic acid residue 60 ppm) of lithium fluorosulfonate was obtained.

Example 3

A reaction container was charged with 0.50 g (3.7 mmol) of lithium iodide serving as a lithium source and 10 mL of dimethyl carbonate serving as a solvent. Thereto were added dropwise 0.44 g (3.8 mmol) of chlorosulfonic acid serving as a sulfonic acid source and 0.97 g (3.7 mmol) of tetrabutylammonium fluoride serving as a fluorine source, and the contents were reacted at 70° C. The reaction was followed by filtration of the reaction solution to remove the residue, and the solution was then cooled down to 5° C. Thereby, 0.5 g of lithium fluorosulfonate containing dimethyl carbonate was obtained. The dimethyl carbonate was then evaporated therefrom, whereby 0.3 g (2.8 mmol, yield 74%, chlorosulfonic acid residue 103 ppm) of lithium fluorosulfonate was obtained.

Reference Example 1

A reaction container purged with nitrogen was charged with 1.0 g (23.6 mmol) of lithium chloride serving as a lithium source and 60 mL of dimethyl carbonate serving as a solvent. Thereto was added dropwise 2.8 g (28.0 mmol) of fluorosulfonic acid serving as a sulfonic acid source and a fluorine source, and the contents were reacted in an ice bath for two hours and then at room temperature for one hour. The reaction was followed by evaporation of the solvent. Then, 60 mL of dimethyl carbonate was again added as a recrystallization solvent and the mixture was heated up to 60° C., so that crude lithium fluorosulfonate was completely dissolved. The solution was filtered so that the residue was removed, and the solution was cooled down to 5° C. Thereby, 5.30 g of lithium fluorosulfonate containing dimethyl carbonate was obtained. The dimethyl carbonate was then evaporated therefrom, whereby 2.50 g (23.6 mmol, yield 83%) of lithium fluorosulfonate was obtained.

Reference Example 2

A reaction container purged with nitrogen was charged with 1.00 g (144.1 mmol) of lithium metal serving as a lithium source and 120 mL of diethyl ether serving as a solvent. Thereto was added dropwise 12.0 g (119.9 mmol) of fluorosulfonic acid serving as a sulfonic acid source and a fluorine source, and the contents were reacted in an ice bath for two hours and at room temperature for one hour. The reaction was to be followed by evaporation of the solvent, but the liquid was highly viscous, which means a failure in providing the target product.

INDUSTRIAL APPLICABILITY

The method for producing lithium fluorosulfonate of the invention can provide lithium fluorosulfonate using starting materials which are easy to obtain and handle by a simple and easy method, greatly contributing to improvement of productivity.

The invention claimed is:

1. A method for producing lithium fluorosulfonate comprising
reacting $XSO_3H$, wherein X is a leaving group other than fluorine, with a lithium source and a fluorine source, wherein $XSO_3H$ is chlorosulfonic acid where X is chlorine and the lithium source and the fluorine source are lithium fluoride.

* * * * *